United States Patent
Wright et al.

(10) Patent No.: US 11,875,402 B2
(45) Date of Patent: *Jan. 16, 2024

(54) SYSTEM AND METHOD TO CREATE AND OPERATE AN ELECTRONIC MARKETPLACE OF TRUSTED BANKS FOR PARTICIPATION IN COMMERCIAL LOANS TOO LARGE FOR AN INDIVIDUAL BANK

(71) Applicant: Radius Group, LLC, Little Rock, AR (US)

(72) Inventors: David M. Wright, Seattle, WA (US); Emile Reed, Denver, CO (US); Donald F. Seacrest, Aurora, CO (US); Cade C. Strieby, Denver, CO (US)

(73) Assignee: BLP, Inc., Little Rock, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,286

(22) Filed: Dec. 5, 2022

(65) Prior Publication Data
US 2023/0124849 A1 Apr. 20, 2023

Related U.S. Application Data

(63) Continuation of application No. 17/216,492, filed on Mar. 29, 2021, now Pat. No. 11,521,265, which is a
(Continued)

(51) Int. Cl.
*G06Q 40/00* (2023.01)
*G06Q 40/03* (2023.01)

(52) U.S. Cl.
CPC .................. *G06Q 40/03* (2023.01)

(58) Field of Classification Search
CPC ........................................... G06Q 40/03
(Continued)

(56) References Cited

U.S. PATENT DOCUMENTS 6,920,434 B1 7/2005 Cossette
7,493,279 B1 * 2/2009 Kwan ............... G06Q 40/04
705/37

(Continued)

OTHER PUBLICATIONS

New exploration—the role of E-finance in small business financing; 2013 6th International Conference on Information Management, Innovation Management and Industrial Engineering (vol. 1, pp. 501-504); Chen Su, Hongchun Yuan, Nov. 23, 2013. (Year: 2013).*

(Continued)

*Primary Examiner* — Tien C Nguyen
(74) *Attorney, Agent, or Firm* — Haynes Beffel & Wolfeld LLP; Ernest J. Beffel, Jr.

(57) ABSTRACT

The technology disclosed relates to creation and operation of a marketplace among trusted small and medium sized banks for participation in commercial loans too large for an individual participating bank to undertake on its own. This technology can be applied to formation of other marketplaces in which trust matters and controlled dissemination of opportunity information, as in layers or rounds, proceeds manually. Aspects of the technology disclosed can be used by initiators and participants to syndicate loans once a marketplace is established, whether the market is established applying the technology disclosed or otherwise. This technology also can be applied to syndicate other opportunities or to resell participations in syndicated loans that have closed and been funded.

24 Claims, 11 Drawing Sheets

Related U.S. Application Data continuation of application No. 14/612,213, filed on Feb. 2, 2015, now Pat. No. 10,963,957.

(60) Provisional application No. 61/935,298, filed on Feb. 3, 2014.

(58) Field of Classification Search
USPC .................. 705/40, 37, 39, 26, 35; 719/328; 717/108; 715/704; 709/201, 227; 235/375, 380
See application file for complete search history.

(56) References Cited

U.S. PATENT DOCUMENTS

| | | | |
|---|---|---|---|
| 7,599,879 B2 | 10/2009 | Louie et al. | |
| 7,653,592 B1* | 1/2010 | Flaxman | G06Q 40/03 705/37 |
| 7,716,125 B2* | 5/2010 | Shavit | G06Q 40/02 705/38 |
| 7,761,356 B2* | 7/2010 | Daniels | G06Q 40/06 705/36 R |
| 7,822,681 B2* | 10/2010 | Farias | G06Q 20/102 705/38 |
| 7,925,579 B1* | 4/2011 | Flaxman | G06Q 40/00 705/37 |
| 8,639,614 B2* | 1/2014 | Greenland, II | G06Q 40/04 235/379 |
| 8,660,942 B2* | 2/2014 | Cohen | G06Q 40/03 705/38 |
| 8,751,351 B1* | 6/2014 | Smith | G06Q 40/02 705/26.35 |
| 9,875,491 B2* | 1/2018 | Weksler | G06Q 40/03 |
| 2002/0116327 A1 | 8/2002 | Srinivasan | |
| 2003/0018558 A1* | 1/2003 | Heffner | G06Q 40/02 705/37 |
| 2010/0312691 A1* | 12/2010 | Johnson, Jr. | G06Q 40/03 705/38 |
| 2013/0018777 A1 | 1/2013 | Klein | |
| 2013/0290143 A1 | 10/2013 | Lampl et al. | |
| 2014/0365350 A1* | 12/2014 | Shvarts | G06Q 40/00 705/35 |

OTHER PUBLICATIONS

An Empirical Study on Credit Scoring Model for Credit Card by Using Data Mining Technology; 2011 Seventh International Conference on Computational Intelligence and Security (pp. 1279-1282); Wei Li, Jibiao Liao; Dec. 3, 2011. (Year: 2011).*

"Instructions for Preparation of Consolidated Reports of Condition and Income (FFIEC 031 and 041)", 630 pages. [retrieved Jan. 26, 2014] Retrieved from the Internet:<URL: http://www.ffiec.gov/pdf/FFIEC_forms/FFIEC031_FFIEC041_201309_i.pdf>.

"Schedule RC-C—Loans and Lease Financing Receivables", 52 pages, [Retrieved on Jan. 26, 2014], Retrieved from the Internet:<URL: http://www.fdic.gov/regulations/resources/call/crinst/2013-09/913RC-C1_093013.pdf>.

U.S. Appl. No. 14/612,213—Office Action dated Mar. 28, 2018, 4 pages.

U.S. Appl. No. 14/612,213—First Action Interview Office Action Summary dated Sep. 11, 2018, 6 pages.

U.S. Appl. No. 14/612,213—First Action Interview Office Action Summary dated Nov. 5, 2018, 7 pages.

U.S. Appl. No. 14/612,213—Response to Office Action dated Nov. 5, 2018, filed Mar. 4, 2019, 44 pages.

U.S. Appl. No. 14/612,213 Final Office Action dated Jun. 14, 2019, 12 pages.

DeSmith, Donald, et al, "Michigan Data Translator Design Specifications", Michigan Univ Ann Arbor Graduate School of Business Adminstration, Oct. 1, 1977, 78 pages, (accessed at https://apps.dtic.mil/sti/citations/ADA061491).

Lee, V. Nan Wang;, "In Intelligent System for Business Loan Processing; 2012 Third International Conference on Intelligent Systems Modelling and Simulation", (pp. 390-396); Feb. 1, 2012; ISBN (Paper): 978-1-4673-0886-1. (Year: 2012).

Mpardis, G. Kotsilieris, T., "Bank Loan Processes Modelling Using BPMN; 2010 Developments in E-systems Engineering", (pp. 239-242); Sep. 1, 2010; ; ISBN (Paper): 978-1-4244-8044-9. (Year: 2010).

U.S. Appl. No. 17/216,492—Office Action dated Dec. 22, 2021, 8 pages.

* cited by examiner

Fig. 7

Current Portfolio

| Brian Fontana | Brian Fontana | Brian Fontana |
|---|---|---|
| Bank Name Trust & Savings<br>Bank Location<br><br>$2,000,000<br><br>More | Bank Name Trust & Savings<br>Bank Location<br><br>$2,000,000<br><br>More | Bank Name Trust & Savings<br>Bank Location<br><br>$2,000,000<br><br>More |

View More +

Historical:

| Loan 1 | 7/15/13 |
|---|---|
| Loan 2 | 6/30/13 |
| Loan 3 | 1/31/13 |
| Loan 4 | 12/15/12 |
| Loan 5 | 10/15/12 |

Fig. 10

Notifications

Ron Burgundy

Ron Burgundy

Ron Burgundy

Fig. 11

Opportunity Details | Documents | Participants | Transactions

Borrower

Joe Businessowner
CEO

Eat At Joe's Restaurants
1234 Happy St
Suite 400
Boulder, CO 80111

Description

Loan Narrative:
In pellentesque faucibus vestibulum. Nulla at nulla justo, eget luctus tortor. Nulla facilisi. Duis aliquet egestas purus in blandit. pellentesque faucibus vestibulum. Nulla at nulla justo, eget luctus tortor.

Read More +

Borrowing Need:
In pellentesque faucibus vestibulum. Nulla at nulla justo, eget luctus tortor. Nulla facilisi. Duis aliquet egestas purus in blandit. pellentesque faucibus vestibulum. Nulla at nulla justo, eget luctus tortor Read More +

Stats

| | |
|---|---|
| Loan Type: Commercial Real Estate | Guarantor(s): 8 |
| Industry: Technology | Guarantor(s) Amount: Unlimited |
| Loan Rate: 4.7% | Tentative Closing Date: 04/17/2014 |
| Loan Amount: $23,000,000 | Closing Date: 04/17/2014 |
| Participation Amount: $12,000,000 | Funding Date: 01/17/2014 |
| | Loan Term: 60 Months |

Borrower General:
In pellentesque faucibus vestibulum. Nulla at nulla justo, eget luctus tortor. Nulla facilisi. Duis aliquet egestas purus in blandit. pellentesque faucibus vestibulum. Nulla at nulla justo, eget luctus tortor. Duis aliquet egestas purus in blandit. pellentesque faucibus vestibulum. Nulla at nulla justo, eget luctus tortor.

Preliminary Underwriting

| | |
|---|---|
| Capacity: Duis aliquet egestas | Capital: Text regarding capital |
| Debt / Income: 12% | Asset Composition: Duis aliquet egestas |
| Liquidity: 26% | Liability Composition: Duis aliquet egestas |
| Collateral (Total Amount): $800,000 | Net Worth: $100,000,000 |
| Type of Collateral: Buildings, Real Estate | Debt to Net Worth: 8% |
| Loan To Value: 8% | |

Fig. 17

SYSTEM AND METHOD TO CREATE AND OPERATE AN ELECTRONIC MARKETPLACE OF TRUSTED BANKS FOR PARTICIPATION IN COMMERCIAL LOANS TOO LARGE FOR AN INDIVIDUAL BANK

CROSS-REFERENCE TO RELATED APPLICATIONS

This application is a continuation of U.S. application Ser. No. 17/216,492, titled "System and Method to Create and Operate an Electronic Marketplace of Trusted Banks for Participation in Commercial Loans Too Large for an Individual Bank," filed 29 Mar. 2021, now U.S. Pat. No. 11,521,265, issued 6 Dec. 2022, which is a continuation of U.S. application Ser. No. 14/612,213 filed 2 Feb. 2015, now U.S. Pat. No. 10,963,957, issued 30 Mar. 2021, which claims the benefit of U.S. Provisional Patent Application No. 61/935,298, filed on 3 Feb. 2014. The priority applications are incorporated by reference in its entirety for all purposes.

BACKGROUND

Field

The technology disclosed relates to creation and operation of a marketplace among trusted small and medium sized banks for participation in commercial loans too large for an individual participating bank to undertake on its own. This technology can be applied to formation of other marketplaces in which trust matters and controlled dissemination of opportunity information, as in layers or rounds, proceeds manually. Aspects of the technology disclosed can be used by initiators and participants to syndicate loans once a marketplace is established, whether the market is established applying the technology disclosed or otherwise. This technology also can be applied to syndicate other opportunities or to resell participations in syndicated loans that have closed and been funded.

Introduction

Small and medium-sized banks have difficulty competing with large banks for multi-million dollar commercial loans. Limited capital restricts their ability to compete. They have less absolute capacity for funding loans. They also have less capacity for concentrated risks.

There are many more small and medium-sized banks than large banks—there are more than 4000 regulated small banks in the United States. These banks are geographically dispersed and have small loan departments. Some of them are in small communities or rural areas.

Banks in small communities have occasional opportunities to initiate and issue multimillion dollar commercial loans. For instance, a local business may become wildly successful and need capital to expand. Or, a new housing boom may convert rural land into bedroom community housing. Or, an agricultural operation may expand. These opportunities may be out of proportion to the small local bank's loan capacity. They are often one-off opportunities.

Small and medium-sized banks sometimes compete with large banks by syndicating a loan package. The chief credit officer (CCO) of the initiating bank works their Rolodex and phone. They call CCO counterparts that they trust at other banks. This process is limited by the size of the chief credit officer's circle of trust. It is time-consuming and typically relies on non-secure, inefficient exchange of documents.

An opportunity arises, from new insights into formation conditions for a marketplace that has never existed in an organized form, to create and operate an electronic marketplace in which trusted chief credit officers of banks market opportunities, syndicate and resell participations in commercial loans that exceed the capacity of an individual small or medium-sized bank.

SUMMARY

The technology disclosed relates to creation and operation of a marketplace among trusted small and medium sized banks for participation in commercial loans too large for an individual participating bank to undertake on its own. This technology can be applied to formation of other marketplaces in which trust matters and controlled dissemination of opportunity information, as in layers or rounds, proceeds manually. Aspects of the technology disclosed can be used by initiators and participants to syndicate loans once a marketplace is established, whether the market is established applying the technology disclosed or otherwise. This technology also can be applied to syndicate other opportunities or to resell participations in syndicated loans that have closed and been funded.

Other aspects and advantages of the technology disclosed can be seen on review of the drawings, the detailed description and the claims, which follow.

BRIEF DESCRIPTION OF THE DRAWINGS

FIG. 7 illustrates an example interface that supports browsing of opportunities and banks.

FIG. 8 illustrates an example interface for applying to join electronic loan participation marketplace.

FIG. 9 illustrates an example interface for viewing and maintaining a particular user profile. Certain text in the figure is placeholder text in pseudo-Latin and has no English equivalent FIG. 10 illustrates an example display of historical performance data.

FIG. 11 illustrates an example display of notifications. Certain text in the figure is placeholder text in pseudo-Latin and has no English equivalent

FIG. 17 illustrates an example detailed description of an opportunity. Certain text in the figure is placeholder text in pseudo-Latin and has no English equivalent

DETAILED DESCRIPTION

A detailed description of implementations of the technology disclosed is provided with reference to the FIGS. 1-19.
Marketplace Organization A major innovation by these inventors has been to understand from a practical perspective one set of conditions sufficient for establishment of an electronic automated marketplace for loan participation among small and medium sized banks of multi-million dollar commercial loans that would be considered too large for an initiating bank to undertake on their own. Elements considered enabling to creation of a marketplace are: First, the marketplace vets participating executives, typically chief credit officers, of small and medium sized banks in a way that instills trust and confirms authorization of individuals to transact business. Second, the marketplace automates marketing and participation in opportunities. Third, initiating CCOs control the audience for the opportunities that they post. Fourth, opportunities are described in a consistent manner to facilitate automatic processing. Fifth, escalation of information dissemination to include confidential information of the prospective borrowers and initiating banks is preceded by execution of a confidentiality agreement by an executive or delegate with authority to bind the potentially participating bank. Optionally, calculated statistics on performance of at least initiating banks from non-published sources is handy for review when considering opportunities. It may be that a marketplace could be created under slightly less rigorous conditions, such as if users were required to rely their own prior experience with or perform research into the background of an initiating bank. As another example, standing agreements for confidentiality could be applied to particular opportunities without renegotiation or reexecution. Aspects of the technology disclosed empower or build on the availability of a new kind of marketplace however it comes into existence.

Realizing conditions that may be sufficient for creating an electronic automated marketplace for loan participation among small and medium sized banks could be considered an exercise in experimental economics, in that the insights of these inventors about small and medium sized bank loan participation cannot be derived from standard economic, banking or computer operating principles. These inventors were particularly well situated to reach their insights from their experience as managers within a highly rated small bank that regularly participates in loan participation. The named inventors are not presently aware of any suggestion or effort by others to create an automated marketplace for participation among small and medium sized banks of multi-million dollar commercial loans with the characteristics suggested by their insights.

Figure 1:
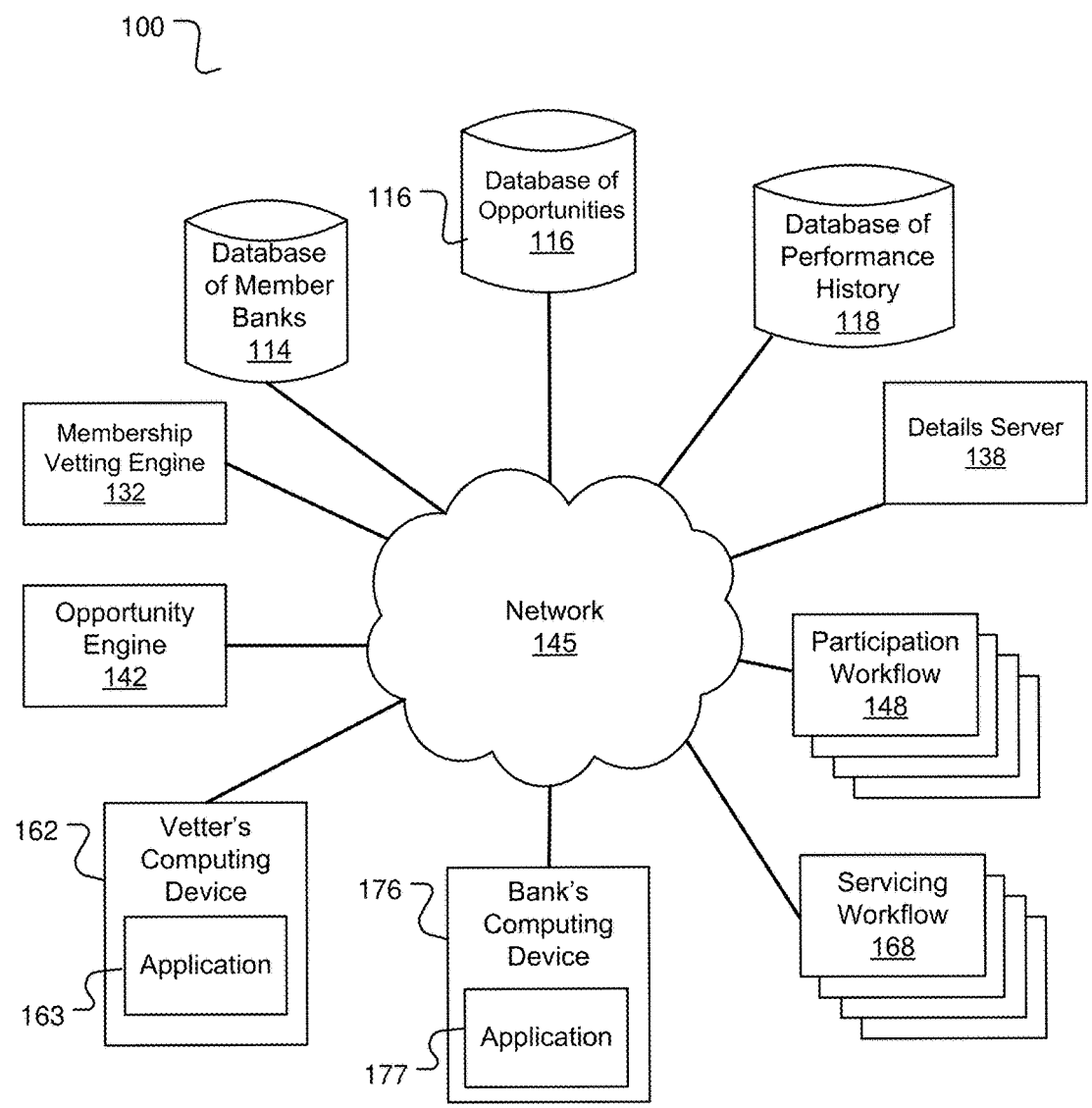
FIG. 1 shows an example environment of forming and operating an electronic marketplace used by trusted banks to syndicate loans.

A new computer system allows establishment and operation of an electronic marketplace for participation in commercial loans larger than an issuing bank is willing to take on by themselves, as shown in FIG. 1, which is described below.

Trust among participants in this marketplace is reinforced by vetting entry and membership. See FIG. 2. This mixes automated processes and human judgment. It is backstopped by objective profile and historical performance data that describes participants. Trust can be extended from a core of trusted individuals to persons that they trust, by implicit vouching. Potential participants are encouraged to join in loan participation when those that they trust have already joined in participation, following their lead.

Degrees of trust are personal to individual CCOs and are managed accordingly. See FIG. 3.

Standardized opportunity presentation displays facilitate consideration of more opportunities than would be possible using existing manual models. See FIGS. 3-4. Searching and filtering capabilities build on standardized opportunity presentations. Standardized opportunity presentation facilitates access to more banks in more regions than current processes allow. This spreads risk and allows participation with smaller parts of deals. It allows banks to initiate larger loans, as multiples of their capital. It eases and automates coordination. It is expected to change the scale of participation by orders of magnitude or at least significantly.

Role-based participation by officers and employees of banks separates analysis from decision-making and authorization. This can separate the process of sourcing loans from analysis and decision making.

Formally authorized escalation of access to opportunity information protects borrower privacy and initiating bank prospects. See FIG. 4.

One new result is exposure of an opportunity to a wider circle of trustworthy, vetted CCOs than manual methods accomplish. Another new result is a display to an interested CCO of a wider range of participation opportunities than can presently be viewed at once. Establishing a marketplace of trusted CCOs creates a price discovery opportunity (which is beyond the scope of this disclosure and the subject of a future disclosure.) Improved market efficiency is likely to greatly reduce transaction costs and improve liquidity.

Combination of wider exposure and standardized documentation creates opportunities to concentrate a bank's participation within a loan type segment or to diversify participation among loan type segments. In this application, a loan type categorizes collateral backing of the loan and a category of use of the loan proceeds. From the Federal Financial Institutions Examination Council's (FFIEC's) required Report of Conditions, instructions for schedule RC-C part 1, major loan types include: (1) Loans secured by real estate; (2) Commercial and industrial loans; (3) Loans to individuals for household, family and other personal expenditures; and (4) All other loans. These major loan types can be divided into subtypes. Subtypes of Loans secured by real estate include: (a) Construction, land development and other land loans; (a1) 1-4 family residential construction loans; (a2) Other construction loans and all land development and other land loans; (b) Secured by farmland; (c) Secured by 1-4 family residential properties; (c1) Revolving, open-end loans secured by 1-4 family residential properties and extended under lines of credit, etc. Examples of loans included in Commercial and industrial loans, which can be adopted as subtypes, include: (a) mining, oil- and gas-producing, and quarrying companies; (b) manufacturing companies of all kinds, including those which process agricultural commodities; (c) construction companies; (d) transportation and communications companies and public utilities; (e) wholesale and retail trade enterprises and other dealers in commodities; (f) cooperative associations including farmers' cooperatives; (g) service enterprises such as hotels, motels, laundries, automotive service stations, and nursing homes and hospitals operated for profit; (h) insurance agents; and (i) practitioners of law, medicine, and public accounting. Subtypes of loans to individuals include: (a) Credit cards; (b) Other revolving credit plans; (c) Automobile loans; (d) Other consumer loans; etc. These categorizations are taken from the September 2013 version of instructions for completion of forms FFIEC 031 and 041, accessed from the FFIEC.gov website, which is hereby incorporated by reference. These terms are more fully described in the glossary to the instructions. In addition to the regulatory types and subtypes, commercial subtypes can be adopted for marketing and analysis. The commercial subtypes describe functionally significant market segments that correspond to bank "appetites" for participation in loans.

Automated access can be provided to profiles, performance histories and metrics calculated from unpublished sources for initiating and participating banks. The FDIC maintains public records of self-reporting, in quarterly call reports, and its own rating of banks. While these are so-called public records, they are unpublished and have historically required a Freedom of Information Act (FOIA) request to gain access. The technology disclosed can further include calculating metrics of initiating and participating banks, of members of the loan participation marketplace, and making the calculated statistics readily available.

Automated expansion of the audience for a participation offering can result in over-subscription of interest in opportunities that current personalized approaches discourage. In one implementation, the group CCOs who receive notice of an opportunity expands, which generates more widespread interest. In another implementation, the circle of CCOs who receive access to participate expands, which increases the number of likely bids to participate. When notice of an opportunity is broader than access to participate, prospective participant CCOs have a new mechanism for gaining introductions to and eliciting the trust of initiating CCOs. When subscription to good opportunities is slightly depersonalized, over-subscription is more likely than when a CCO is making direct contact with those in their personal circle of trust. This leads to potential over-reserved deals with a waiting list. In the above noted event where a participant drops out, the issuing bank immediately has a waiting list of potential partners/fill-ins to the deal.

In contrast, current processes use a limited number of contacts to bring participation into a loan/deal. The CCO's universe of potential participants is limited to current contacts. This limited, rolodex-based audience leads to only a few parties being involved and they are not easily contacted. From this, the issuer generally stops seeking additional outside involvement once a deal is full. In the event one of the participants needs to drop out, a new party is required to keep the deal moving forward. This involves going back to the rolodex and contacting others and getting them up to speed, hopefully in time to keep the deal alive.

A multi-bank workflow (see FIG. 5) increases the likelihood of a participation proceeding to completion. Over-subscription and automated expansion help an initiating CCO overcome setbacks such as the withdrawal of an interested bank from participation. The technology disclosed allows little to no slowdown in getting the deal done.

In the future, it is expected that an auction based price discovery system will be implemented to complement the technology disclosed, leading to more beneficial terms for the issuer.

Among syndicated and already funded loans, an opportunity to resell loan participations arises. An individual CCO can go to the marketplace to sell or subdivide their syndicated interest. An aggregator can package multiple syndicated risks for resale or securitization with a reliable and computer accessible history of the underlying risks.

Combining syndicated loan package servicing management with the loan participation marketplace can enhance grading of risks (which is beyond the scope of this disclosure and the subject of a future disclosure.) A broader and more reliable performance history becomes available, in part because a servicing organization that publishes performance history is less likely to routinely grant technical exceptions to borrower financial reporting requirements.

The technology disclosed can be enhanced by publishing public facing webpages that describe members in the participation marketplace. This portal will allow a user to display past deals, resume information, loan interest, etc. The portal will also have a CRM for customer information and deal sourcing, a proposal generation tool as well as a unified messaging system. The portal will be an all-encompassing web-based application/solution for bankers, centralizing the tools key to daily operations that today are currently fragmented.

Banker's portal which encompasses all daily tools utilized to go about job (CRM, Document Exchange, Unified Messaging, Calendars)

Structuring/Managing Sales/Marketing Campaigns

Client Document Uploads

Other $3^{rd}$ party tools lenders use as part of the job, built directly

The purpose of this portal is to allow a customer to view and communicate directly with a user for potential loans, allowing a potential loan customer to pass various data elements about a potential loan to a lender as well upload any documents necessary to complete. A key component of this exchange is the standardization of information based on which product is being requested. This creates efficiencies for both the borrower and lender. This portal will also be used for a lender to communicate any decisions that occur to the potential customer.

System Introduction

FIG. 1 shows an example environment 100 of forming and operating an electronic marketplace used by trusted banks to syndicate loans. FIG. 1 includes databases of member banks 114, opportunities 116 and performance history 118. FIG. 1 also shows computing devices of at least one vetter 162 and bank 176. These computing devices run an application 163, 177 and connect to network(s) 145. Several engines, servers and systems are shown: a membership vetting engine 132, an opportunity engine 142, a details server 138, a participation workflow 148 and a servicing workflow 168. In other implementations, environment 100 may not have the same elements or components as those listed above and/or may have other/different elements or components instead of, or in addition to, those listed above, such as a database of tourist (non-bank) subscribers, multi-tiered web server architecture, or numerous bank computing devices. The different elements or components can be combined into single software modules and multiple software modules can run on the same hardware.

In some implementations, network(s) 145 can be any one or any combination of Local Area Network (LAN), Wide Area Network (WAN), WiFi, WiMax, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

In some implementations, the engines, servers and systems can be of varying types including a workstation, server, computing cluster, blade server, server farm, or any other data processing system or computing device. The engines, servers and systems can be communicably coupled to the databases via a different network connection. For example, the membership vetting engine 132, database of performance history 118, and database of member banks 114 can be coupled via a shared network 145 (e.g., the Internet) or by direct local area network link(s).

In some implementations, the databases can be relational database management systems (RDBMSs), object oriented database management systems (OODBMSs), distributed file systems (DFS), no-schema database, or any other data storing systems or computing devices. In some implementations, computing devices 162, 176 can be a workstation, personal computer, laptop computer, tablet computer, smartphone, personal digital assistant (PDA), digital image capture devices, and the like.

Applications 163, 177 can take one of a number of forms, including user interfaces, dashboard interfaces, engagement consoles, and other interfaces, such as mobile interfaces, tablet interfaces, summary interfaces, or wearable interfaces. In some implementations, they can be hosted on a web-based or cloud-based social application running on a computing device such as a personal computer, laptop computer, mobile device, and/or any other hand-held computing device. They can also be hosted on a non-social local application running in an on-premise environment. In one implementation, application 124 can be accessed from a browser running on a computing device. The browser can be Chrome, Internet Explorer, Firefox, Safari, and the like. In other implementations, application 124 can run as a computer desktop application.

Member bank database 114 specifies various entities (persons and organizations) and their status within the electronic marketplace. All of the banks regulated by federal agencies such as FFIEC and FDIC can be compiled in the member banks database 114 and their status a member or not is updated when they enroll. Use of a government generated roster of banks can simplify enrollment and vetting. The persons can be associated with banks. In some implementations, bank officer background information can be compiled from regulatory filings. Persons not associated with bank can be granted a tourist status that allows them limited access to certain information, but not participation in the marketplace. Regulators and economic forecasters, for instance, could be tourists. In some implementations, multiple databases could store this information, such as a regulated banks database, a user's database, and an enrolled members' database. Or, separate tables or objects within a single database could hold the different types of information.

Opportunities database 116 specifies opportunities for participation in loan participations. The opportunities database 116 in this figure represents a variety of data types, including pre-publication draft opportunities, published opportunity summaries, and detailed opportunity information. In some implementations, multiple databases could store this information, or separate tables or objects within a single database could hold the different types of information.

Performance history database 118 stores performance histories of banks. One source of performance histories is filings with the FDIC that are considered public records, but which must be compiled and converted into electronic form for practical access. Bank ratings by FDIC or other regulatory agencies reflect aggregate performance history. When the marketplace is integrated or cooperating with a servicing agency, disaggregated data about performance of individual loans can become available. More complete performance histories can be constructed from loan servicing information than from call reports and the like filed with banking agencies. In some implementations, multiple databases could store performance information, or separate tables or objects within a single database could hold the different types of information.

Figure 2:
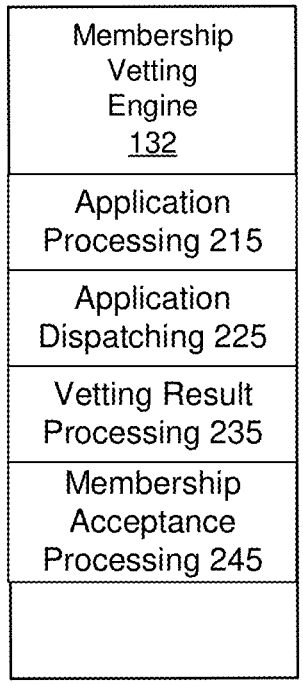
FIG. 2 is a high-level block diagram of the membership vetting engine.

Membership vetting engine 132 processes applications by banks to join the electronic marketplace for participation. One implementation of the membership vetting engine 132 is illustrated by FIG. 2. This figure is a high-level block diagram of the membership vetting engine 132. It illustrates application processing 215, application dispatching 225, vetting result processing 235, and membership acceptance processing 245. Application processing 215 receives application information from a user's workstation, typically via a graphic user interface. The user can be an applicant or person communicating with an applicant and entering information on their behalf. When application is sufficiently complete, application dispatching 225 forwards the application to a human for vetting. In this application, vetting includes at least interviewing an executive of an applicant organization or running a background check. Vetting further includes applying human judgment before enrolling the applicant organization in the loan participation marketplace. The system receives results of the human vetting through vetting result processing 235. Vetting can result in the approval for enrollment, denial for enrollment or further inquiry. Vetting result processing 235 forwards accepted applications to membership acceptance processing 245, which enrolls the applicant as a member of the electronic marketplace for loan participation. For instance, membership acceptance processing 245 can post the new enrollee's status to the database of member banks 114. It can notify the new enrollee of acceptance and further steps to be taken. In other implementations, membership vetting engine 132 may not have the same elements or components as those listed above and/or may have other/different elements or components instead of, or in addition to, those listed above, such as a components to assist a human when vetting an application. The different elements or components can be combined into single software modules and multiple software modules can run on the same hardware.

Figure 3:
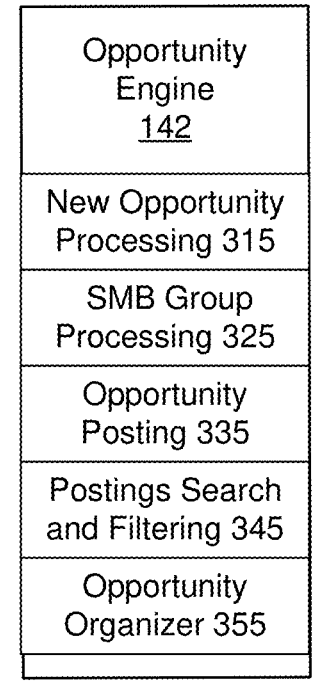
FIG. 3 is a high-level block diagram that illustrates new opportunity processing, group processing, opportunity posting, posting search and filtering, and an opportunity organizer.

Opportunity engine 142 processes opportunities offered by initiating banks to potentially participating banks. These opportunities can be posted to other parties that are not initially eligible to participate. One implementation of the opportunity engine 142 is illustrated by FIG. 3. This high-level block diagram illustrates new opportunity processing 315, group processing 325, opportunity posting 335, posting search and filtering 345, and opportunity organizer 355. New opportunity processing 315 interacts with the user to assemble fielded information in a standardized format suitable for automated processing. Group processing 325 interacts with the user to create one or more trusted groups of prospects to whom opportunities be published. These trusted groups may be constructed concentrically or based on different appetites. Potential prospect banks can belong to multiple groups. List-based selection, criteria-based selection and drag-and-drop interfaces are all suitable for creating trusted groups. Opportunity posting 335 publishes opportunities entered through new opportunity processing for viewing by potential prospects that belong to groups established by group processing 325. Opportunity posting 335 can distinguish between posting of opportunities for information and for potential participation. An audience able to view opportunities for information can be broader than the audience of potential participants. Postings search and filtering 345 processes requests to view opportunities. In response to queries, it returns the list of opportunities. In response the application of filters, it reduces the number of opportunities returned. Opportunity organizer 355 interacts with the user's workstation to prioritize, tag, score or otherwise organize opportunities. It can set notification triggers for opportunities or groups of opportunities. For instance, it can alert the user when a participation opportunity of interest reaches a 50% reservation level. As above, in other implementations, opportunity engine 142 may not have the same elements or components as those listed above and/or may have other/different elements or components instead of, or in addition to, those listed above. The different elements or components can be combined.

Figure 4:
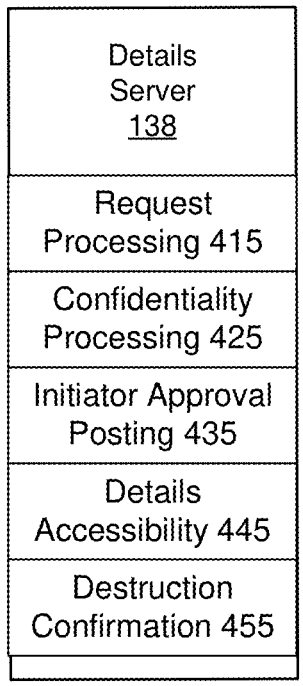
FIG. 4 is a high-level block diagram that illustrates request processing, confidentiality processing, initiator approval posting, details accessibility and destruction confirmation.

Details server 138 handles requests for detailed information and returns results. One implementation of the details server 138 is illustrated by FIG. 4. This high-level block diagram illustrates request processing 415, confidentiality processing 425, initiator approval posting 435, details accessibility 445 and destruction confirmation 455. Generally, the details server implements confidential response to request for details. Request processing 415 interacts with prospects that are eligible to request detailed information. Confidentiality processing 425 implements execution or ratification of the confidentiality agreement that needs to be in place before detailed information is revealed. Confidentiality is significant because details of posted opportunities can involve confidential financial information of prospective borrowers and valuable opportunities of initiating banks. Applicants may not wish or expect for their financial information to be freely disseminated. Initiating banks control dissemination of information to minimize the likelihood that a rival bank will identify a prospective borrower and compete, instead of cooperating with the initiating bank. Execution or ratification of an appropriate agreement by an authorized bank officer is essential to bind the bank to the agreement. It is helpful to convey to subordinates that the bank means to respect the participation offered by the initiating bank. Initiator approval posting them will 435 interacts with an officer or delegate of the initiating bank who is specifically authorized to approve requests for detailed information from prospects. In some implementations, preapproval, contingent upon execution or ratification of an appropriate agreement can be authorized for a group or subgroup of prospects as part of group processing 325. Details accessibility 445 is triggered by initiator approval posting 435. When triggered, details accessibility 445 allows particular request stores access to detailed information about a prospect. Destruction confirmation 455 comes into play when a requester declines to participate or withdraws from participation. In some implementations, destruction confirmation 455 might be grouped with another component such as participation workflow 148. Destruction confirmation can involve interaction with prospect banks. It could further implement a document management component such as Digital Arts America's FinalCode, which monitors review of documents and permits a publisher to remotely cancel authorization for a user to open or view a document, even when the user's copy of the document resides on a user controlled system instead of a publisher's system. As above, in other implementations, details server 138 may not have the same elements or components as those listed above and/or may have other/different elements or components instead of, or in addition to, those listed above. The different elements or components can be combined.

Figure 5:
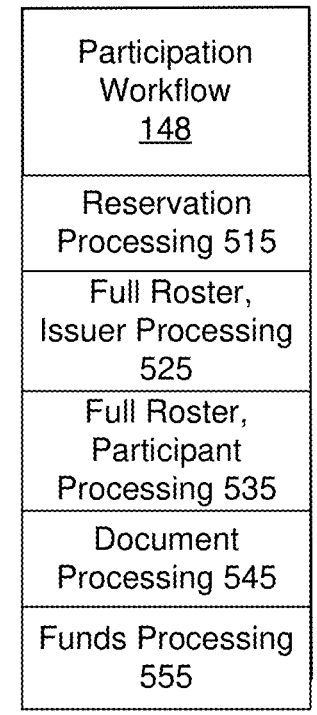
FIG. 5 is a high-level block diagram that illustrates reservation processing, full roster issuer processing, full roster participant processing, document processing and funds processing.

Participation workflow 148 processes participation data flow and interactions, following up on opportunities. One implementation of the participation workflow 148 is illustrated by FIG. 5. This high-level block diagram illustrates reservation processing 515, full roster issuer processing 525, full roster participant processing 535, document processing 445 and funds processing 555. Reservation processing 515 includes interaction with the user's workstation to receive a reservation request for a part, percentage or dollar amount of the participation opportunity. An executive or delegate of a prospect bank steps up to requesting actual participation by submitting a reservation request. Reservation processing 515 receives the request, verifies the authorization, and posts the reservation request for consideration by the initiating bank. It also may support monitoring by the initiating bank of progress towards completing the roster. It may interact with group processing 325 or opportunity posting 335 to expand eligibility to participate in the opportunity. For instance, if a roster is filling slowly, an opportunity may be expanded from a group of most closely trusted banks to a broader group or to all members of the loan participation marketplace. Two full roster components are indicated, which could readily be combined into one. The full roster, issuer or initiating bank processing 525 interacts with the initiating bank once the roster is full, and ways further described below. The full roster, participant processing 535 interacts with participant banks to pre-close the opportunity once the roster spoke. These components may carry out additional steps in case of oversubscription. These components may be called and action taken when a reservation level reaches 100 percent or an opportunity may be left open to see if it gathers an oversubscription. Document processing 545 assembles and processes electronic execution for electronic submission of executed documents needed to close a participation. Funds processing 555 tracks submission of funds by participating banks to a clearing bank and subsequent release of funds from the clearing bank for funding of the loan identified in the participation opportunity. As above, in other implementations, participation workflow 148 may not have the same elements or components as those listed and components can be combined. Another perspective on interaction among these components is provided by the message flow diagram.

Figure 6:
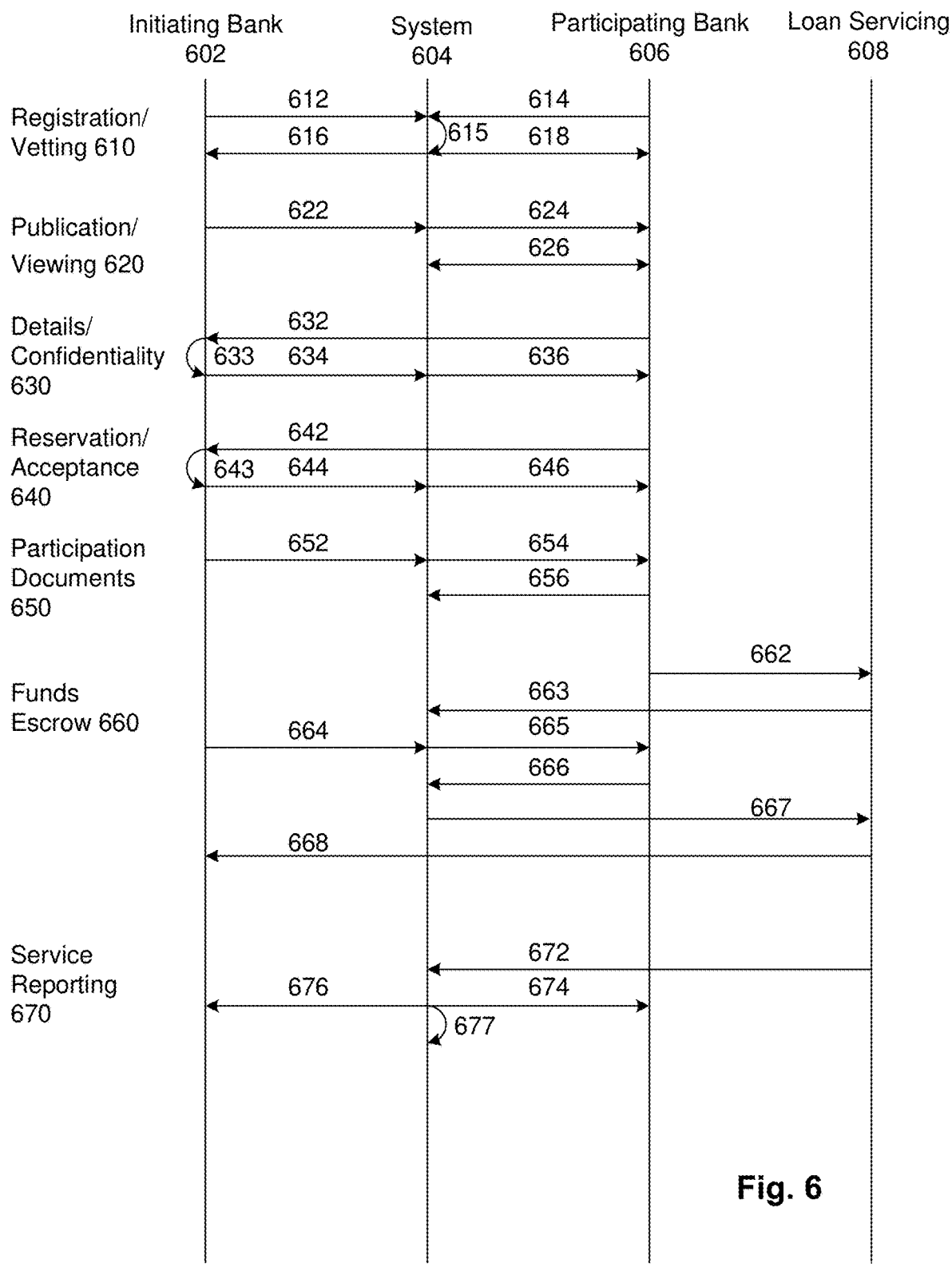
FIG. 6 illustrates a high level message flow among an initiating bank, the system, a participating bank and, in some aspects, loan clearing and servicing.

FIG. 6 illustrates a high level message flow among an initiating bank 602, the system 604 (such as the system illustrated in FIG. 1), a participating bank 606 and, in some aspects, loan servicing 608. Initiating bank can also be described as the issuer bank, in the sense of issuing the opportunity and eventually issuing the loan. The participating bank 606 is one that participates in the participation opportunity, following the lead of the initiating bank. Loan servicing 608 can include both funds clearing and servicing the loan after funding, during repayment. Message flow condenses elements that might otherwise be illustrated in the flow chart. The description that follows describes processes with respect to computer systems representing an initiating bank, an electronic marketplace, participating banks and loan servicing. Examples of these systems are described with respect to FIG. 1. For convenience, the processes referred to system components, but it will be understood that the electronic exchange of information involved in these processes in the functional interaction between process steps could be accomplished using other different hardware.

The first flow is registration and vetting 610. Both initiating banks 602 and participating banks 606 submit their applications or registrations 612, 616 to the system 604. The system alerts a human to vet the applications received. The human takes steps 615 appropriate to verify trustworthiness of the applicant. These steps include at least an interview with a bank officer or a background check on the applicant bank. Additional research by the human may include accessing a performance history database for the applicant bank. The system 604 receives results 615 of the human approval, rejection, or request for additional information related to the application. Upon approval, the system 604 enrolls the applicant bank. Upon approval or rejection, the system 604 notifies initiating bank 602 or participating bank 606 of their status in messages 616, 618, respectively.

The second flow is publication and viewing 620. An initiating bank 602 interacts with the system 604, such as new opportunity processing 315 to prepare an opportunity for publication 622. This includes entering data in a standard format established by the system 604. Preparing the opportunity for publication also involves the initiating bank identifying one or more groups of prospects to whom the opportunity will be available. In some implementations, separate groups of potential prospects will be identified for publication of information and for potential participation. In other implementations, the opportunity may be published to all members and even to tourists, with the opportunity to participate being reserved to banks in a trusted group and verified by the initiating bank 602. When an opportunity is more widely published and then made available for participation, a bank may contact the initiating bank 602 and request to be added to the group of potential participants in the participation. Initiating bank 602 can modify the group or list of potential participants to include the requestor. The system 604 receives instructions from the initiating bank 602 regarding posting and publishing the opportunity 624. Periodically, the system receives from prospective participating banks 606 queries for opportunities 626 and responds with list of opportunities responsive to the queries. The list may be filtered by the system 604 or by an application controlled by the prospective participating bank 606.

The details request and confidentiality flow 630 handles requests for additional information. A request from participating bank 606 is published by the system for viewing 632 by the initiating bank 602. The request is accompanied by execution of an appropriate confidentiality agreement, such as electronic execution, electronic submission of an executed paper document, or electronic verification of a standing agreement between a particular participating bank 606 and the initiating bank 602. Based on human judgment or prior arrangements 633, the initiating bank approves at least some requests for detailed information. The system 604 receives notice 634 from the initiating bank 602 of an approval. The system 604 makes the information available 636. In some implementations, the system 604 provides notification 636 to the participating bank 606 that the details have become available. In some implementations, the confidential information is wrapped in security container, using a tool such as FinalCode provided by Digital Arts-America. Tools of this sort allow the publisher of information to monitor and remotely revoke viewing by recipients of confidential information. While such tools cannot prevent all forms of copying sensitive information, they do ease the burden of destroying detailed information about participation opportunities in which potentially participating bank decides not to proceed.

Reservations and exceptions flow 640 handles reservation requests for our participation in the participation opportunity. A request from participating bank 606 is published by the system for viewing 642 by the initiating bank 602. For instance, reservation processing 515 can handle the electronic submission, consideration and approval of the reservation requests. The initiating bank 602 undertakes its internal processes 643 to determine which, if any, of prospective participating banks 606 will be accepted for participation. The initiating bank 602 is not bound by having included a particular prospective participating bank in a trusted group. Accepting a reservation request involves separate consideration 643 and action by a bank officer or delegate authorized through the system 602, who receives acceptance, rejection and waitlist messages 644 from the initiating bank 602. The system posts 646 the initiating banks decisions to the participating bank 606. In some instances, a bank on a waitlist is promoted from the waitlist to being accepted for participation. The system 604 advises the prospective participating bank that they have cleared the waitlist. The system receives a response from the prospective participating bank regarding continuing interest in the participation opportunity.

The participation documents flow 650 handles execution of documentation for the participation and can handle documentation between the issuer bank and the borrower. The initiating bank 602 submits executed issuer documents for the participation 652 to the system 604. This may be done by electronic execution, electronic submission of an executed paper document, or electronic verification of execution. The system 604 functionally connects the initiating bank's execution participation documents 652 with notification 654 to accepted participating banks 606 and collection of executed participant documents 656. As with the issuer documents, the assembly of participant bank documents may be done by electronic execution, electronic submission of an executed paper document, or electronic verification of execution.

The funds escrow flow 660 involves tracking and authorizing movement of funds through a clearing bank, which is labeled loan servicing 608. Following execution participation documents, the participating bank 606 satisfies the schedule for remitting funds 662 to a clearing bank. In some implementations, funds could be submitted to the initiating bank to be held in trust or to an affiliate of the initiating bank. The system 604 collects information 663 regarding receipt of funds by the clearing bank from the participants. It posts funding status information for review by the initiating bank 602. In due course, the system 604 receives a request 664 for participating bank 606 approval to proceed with disbursement. The system notifies 665 the participating banks 606, receives 666 and collates approvals to proceed. The system can automatically notify 665 the clearing bank 608 and initiating bank 602 that all approvals for disbursement are in place. Outside the system, the clearing bank 608 disperses funds 668 for the benefit of the borrower identified in the participation opportunity. In some implementations, the funds may be dispersed directly by the clearing bank. In other implementations, the funds passed from the clearing bank to the initiating bank for disbursement to the borrower.

The service reporting flow 670 is generally beyond the scope of this disclosure. Service reporting that integrates syndicated loan servicing with the electronic marketplace is expected to be the subject of a further disclosure. In general terms, loan servicing organization 608 may report 674 loan service performance data to the system 604 for incorporation into a database of performance history 118. Aggregated or detailed performance history information can be provided to both initiating banks 675 and participating banks 676. Loan servicing data also can be used 677 by the system 604 to score member banks, which is also beyond the scope of this disclosure and expected to be the subject of a further disclosure.

System Operations

One implementation of the technology disclosed is a web based platform for the banking industry that serves as an online marketplace and virtual community to coordinate participation in syndicated lending and facilitate sales of pre-existing funded loans. The platform allows banks to publicize loan participation opportunities and loans for sale. Other banks can discover and research the opportunities, and make investment decisions and funding commitments. The platform provides tools for all parties to manage the deal process from a) initial offer to b) document transfer to c) making reservation commitments to d) actual funding and closing to e) ongoing performance reporting and monitoring/management throughout the remaining life of the loan. The system combines this automated support to streamline transaction flow with social tools.

The platform provides a robust set of social tools to promote interaction with the website and other registered users at vetted and trusted banks. The social component is fully integrated with the transactional capability. Social features will have signification impact on the ultimate mature stage usage of the platform. The social tools include linking (connecting), activity feeds, following, comments and feedback (posting), notifications/reminders, and messaging. Notifications, reminders and messaging can be done via email and/or SMS (text messaging). The platform can combines the efficiency of online information with the human connection provided by social tools to simplify deal discovery, expand trust in the information and among the member network, and facilitate the transaction process at every stage of the life cycle.

There are four basic levels of user in the system: administrator, bank officer, bank delegate, and tourist. The administrator role is connected to the platform operator. This role is responsible for product administration functions such as vetting users who request authorities, transaction business on the network, selecting opportunities and banks to display on the home page, and recording when funds received are dispersed.

The bank officer role is connected to an enrolled member bank. This is the highest level of authorization for a member. It usually is reserved for the Chief Credit Officer of the bank. The bank officer is affiliated with the bank and authorized to make transactions on the platform that bind the bank. This includes requesting details of opportunities, subject to confidentiality agreements, and commitment to participate in syndicated loans, in reservation requests. A bank officer is manually vetted by a human acting on behalf of the platform. A bank officer has full access to information available to the bank, including individual opportunities and full-blown details. The number of users in a bank that receives bank officer role authorization can be limited, for instance, to two persons. The Chief Credit Officer can designate a second user within the bank to have this highest authorization level.

The bank delegate role can, for instance, be a lender within a bank. The bank delegate can access information, but does not have authorization to make transactions. Registration of bank delegates can be verified by the chief credit officer at the bank with which they are affiliated. This shifts the registration process from the platform operator to the member bank for enrollment of bank delegates. Upon approval, the bank delegate can receive axis to full loan details on a deal-by-deal basis with specific approval by the bank officer. The system supports messaging from the bank delegate to the bank officer and single action approval by the bank officer to grant or deny access to loan details. Bank delegates also can indicate interest in the bank participating alone and suggest a potential investment amount.

Lowest level of authorization is tourist. The tourist is registered with a website for the platform, but is not affiliated with a member bank. To the extent permitted by initiating banks, tourists can view individual opportunities and bank performance data, but cannot access or even request full loan details. Tourists can follow banks, deals, etc.

The technology disclosed can support both loan participations and resale of funded loans. Loan participations otherwise referred to as participation opportunities. An initiating bank is funding a portion of the loan and seeking one or more other banks to get the loan fully funded. This kind of transaction is complex and involves simultaneous management of frequent communications with multiple parties. The timeline can be unforgiving. These deals are currently handled manually with processes that vary from bank to bank. The platform introduces automated support and a standard information flow for loan participation deals.

Sale of a loan involves a bank that holds the loan and wishes to sell the loan outright to another bank. These transactions typically involve two parties. Emergence of a marketplace for syndicated loans invites selling of loans in the same marketplace. Both of these types of transactions are common in the banking industry due to regulatory loan limits, capital structure requirements, and risk management techniques.

The principal entities in the platform, from a data, relationship and lifecycle perspective, are banks, users and opportunities. Data regarding banks is collected from a variety of sources, including FOIA requests to bank regulators. The data collected includes basic identification and address information, as well as background details on capitalization and asset quality. Banks contribute to their profiles a loan appetite that specifies preferences for loans that it expects to initiate, participate in, buy, or sell. Marketplace participation statistics also can be compiled, including number and dollar amount of loans initiated, number and dollar amount of loans participated in, average loan size, and social statistics such as number of followers. Statistics can be broken down and displayed by various attributes, including loan type and geography. Bank entities in the platform relate to users and opportunities as follows. Banks are associated with users, both bank officers and bank delegates. Banks have participation and loan sales opportunities. Banks participate in opportunities offered by others and purchase loans. Over time, a bank enrolls in the platform, updates its profile, and may retire from the system. Bank participation in the platform begins when a user registers and requests affiliation and authorization tack on behalf of that particular bank. Some bank data can be preloaded from regulatory sources. In addition to being displayed as part of the bank's profile, data from regulatory sources will allow users to select the bank from a dropdown list. After the authorized user is vetted by a human and their registration is approved, the applying user or their delegate will complete the bank profile.

User entities will collect data in a profile that includes basic information, such as name, contact information, password etc. and the user's company affiliation. Loan appetite information can pass through from the bank user and can be specialized by an individual user. Platform use statistics can be tracked at an individual level, similar to tracking at a bank level. Resident stirred users can be affiliated with the bank and connected to any deal that is active, on either side of the transaction. Their level connection will depend on whether they are bank officer or the bank delegate. Over time, the user is enrolled, updates their profile and may retire from the system. Bank officer authorization requests for vetted by platform that adding staff. Think delegate users can be authorized by bank officers for the same bank.

Opportunity entities in the platform will be published only by the bank officer. An opportunity can include basic loan details such as transaction type (participation, sale), loan type, total amount, participation amount, rate, borrower, guarantors (number and amount guaranteed), collateral type/amount, LTV, etc. It will also include loan documents uploaded at various points during participation: prior to issuing the opportunity, at the final closing and funding stage, and also ongoing regulatory financial performance reporting through the life of the loan. Opportunity entities are related to the issuing bank entities and also to any user entities of users who are active on either side of the transaction.

An opportunity goes through the following stages. In this list, IB indicates the initiating bank that makes the opportunity available and PB indicates the participating bank that joins in the opportunity.

- IB—Initial entry and updates/corrections—opportunity is pending
- IB—List (post) opportunity on the marketplace—opportunity is now active (includes agreeing to standard participation certification processes and use of standard legal agreements)
- PB—Requests for loan details (this is equivalent to indicating interest)
- PB—Grant access to loan details (CCO grants to lenders)
- PB—Access loan details (accept terms of document security access and destruction)
- PB—Reserve spot and commit to loan participation or sale ($ amount)
- IB—Accept/select participants or buyers
- PB—Confirm acceptance by signing participation certification and agreement (legal commitment to participate or buy)
- IB—Maintain and process waitlist, if needed
- IB—Pre-close the participation or sale and set funding date
- IB—Track funds received and disbursed
- IB—Final closing and funding, with final docs uploaded
- IB/PB—Transaction feedback from parties of the transaction
- IB/PB—Ongoing loan monitoring and management, including uploading regulatory financial performance reports. This can include notifying issuing banks of due dates and when new documents have been filed.

During operation, the platform can capture various statistics, including transaction counts, loan or participation amount totals and averages for both users and banks. Capturing running totals saves on sub totaling in response to queries.

Opportunities can be searched overall. All results can be viewed or just top results. Opportunities or banks can be sorted or filtered. Similarly, users of the system can be sorted or filtered. An interactive map can be provided that details opportunities clustered by area. Opportunities can be displayed at various levels, from nationwide to metropolitan area and even to ZIP Code.

Social aspects of the platform include linking, feeds, notifications and reminders and messaging. At least two levels of linking your connection can be provided for trusted counterparts and acquaintances. Other banks or users can be invited to reciprocal linking at either level. Power statistics can be generated indicating the number of connections the user bank has at each level. Activity feeds and the opportunity to follow others are available and can be applied opportunities, banks or users. The number of followers can be tracked and published. Marketplace events can create automatic postings or notifications, without any user activity required. For instance opportunities are being followed can generate events automatically, without the initiating bank taking any particular action. Comments and feedback can be posted to activity feeds. A summary email, daily weekly or on some other frequency can combine information from the feed for periodic review. Pending notifications can be brought a user's attention when the user signs on. They can be forwarded by email or text message. Messages can be transmitted within the social side of platform.

Many of these features are evident in the following wireframe interface example.

Example Interface Wireframes

FIG. 7 illustrates an example interface that supports browsing of opportunities and banks. These opportunities and banks may be returned in response to a search, as top opportunities banks, as recent opportunities and banks, or in response to followings or appetites specified by a user or their bank. The opportunities can be displayed in tiles, lists or columns of details. In the figure, opportunity contacts identified with optional thumbnail pictures 710. Tiles 720 for opportunities include initiating bank name and location 721, the participation overview of loan type, rate and metropolitan location 722, loan total 724 and the thermometer indication of participation percentage completion 726. Buttons are provided for more detail 727 and to follow the opportunity. The user can view all opportunities in the system by pressing a button 729. Filtering criteria can then be supplied to narrow down the results, as an alternative to making a detail query. Similar information is available for banks.

Tiles 730 for banks include thing name and location 731 and aggregate statistics 733. The statistics shown are participations completed, average size, total offerings, average size and number of bank followers. The user can follow the bank by pressing a button 725. They can view all member banks by pressing button 739.

Figures 8, 9:
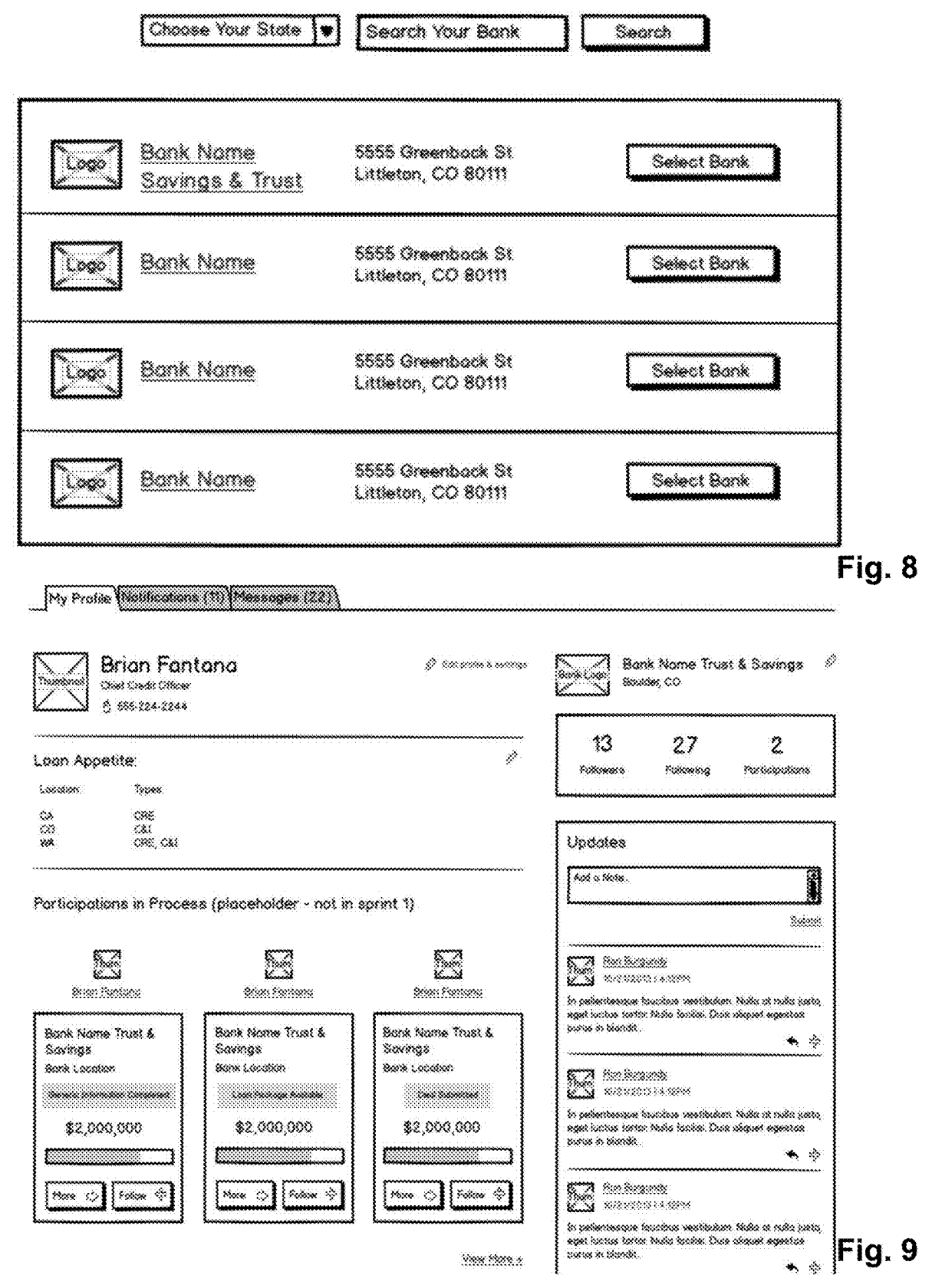

FIG. 8 illustrates an example interface for applying to join an electronic loan participation marketplace. In this example interface, make information is been compiled. The user selects the state 813 and/or searches for particular bank 815. A number of banks are listed and the user and is invited to select the bank with which they are affiliated.

FIG. 9 illustrates an example interface for viewing and maintaining a particular user profile. This is the user profile for Brian Fantana, a Chief Credit Officer 912. This profile indicates 922 a preference for loans in California, Colorado and Washington. The preferred loan types are for commercial real estate in California or Washington and commercial or industrial loans in Colorado or Washington. Deals in progress for the users profile are shown are represented by tiles 932, but could be represented in lists or columns of details. Social statistics 916 for Fantana, in this example, our followers, following, and exit participations. Notes submitted to this user 926 can be listed with the profile.

FIG. 10 illustrates an example display of historical performance data. Tiles 1022 display opportunities initiated by the user and/or bank. The historic list 1032 of completed transactions may supplement the tiles. This may be a simple list as in the figure or it may include additional columns of statistics and description.

FIG. 11 illustrates an example display of notifications.

Figures 12, 13:
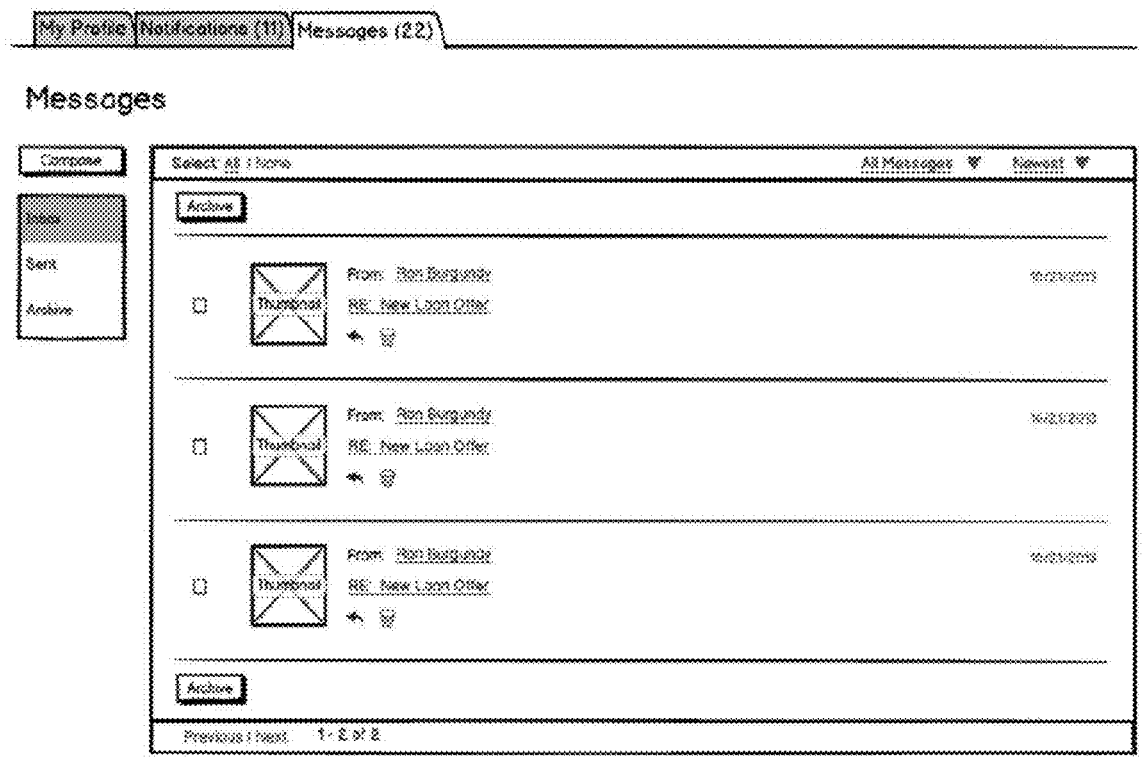
FIG. 12 illustrates an example listing of messages.
FIG. 13 illustrates an example filter set select opportunities.

FIG. 12 illustrates an example listing of messages. Typically, notifications are system generated and messages come from specific users or banks. Accordingly, messages can garner replies.

FIG. 13 illustrates an example filter set to select opportunities in Colorado for commercial and industrial loans working with banks to have total assets the range of $1-$50 million. Applying these filter criteria to the data table provided would eliminate all of the rows visible, because the bank assets listed exceed the total asset criteria for filtering.

Figures 14, 15:
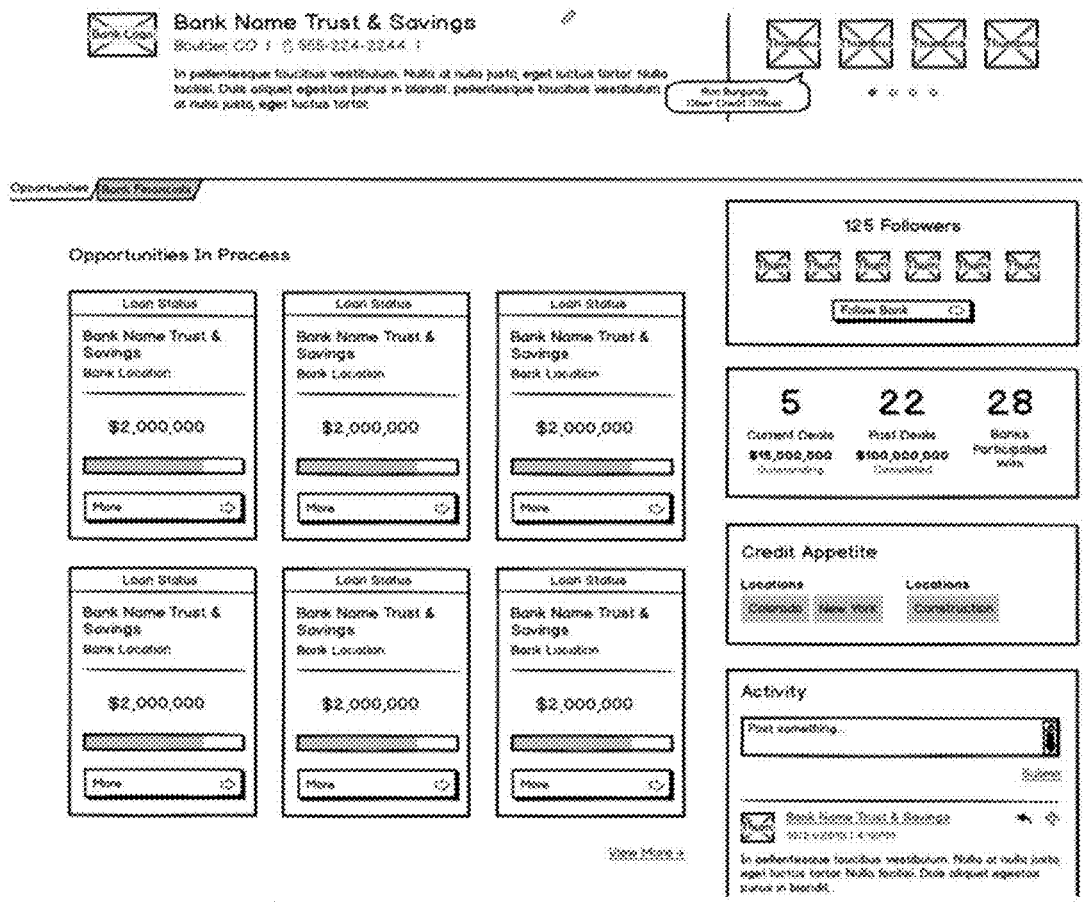
FIG. 14 illustrates an example an example display of opportunities and process for particular bank. Certain text in the figure is placeholder text in pseudo-Latin and has no English equivalent
FIG. 15 illustrates an example of bank financials and metrics calculated from unpublished data.

FIG. 14 illustrates an example display of opportunities and prospects for a particular bank. Individuals affiliated with the bank 1418 identified. In some implementations, their names appear upon rollover. In other implementations, some or all their names may be given. Opportunities and process 1422 are displayed as tiles in this illustration. On the right-hand social column, overview information is provided, including followers 1428, deals 1438, credit appetite 1448 and an activity feed 1458. The followers may be shown as thumbnails and a user invited to join following of the bank. Deals can be summarized in terms of pending deals, completed deals and banks participated with. Drill down to details of these summary statistics may be supported. The credit appetite may include locations and loan types. The activity area they allow posting to the bank.

FIG. 15 illustrates an example of bank financials and metrics calculated from unpublished data. One screen of information may be sufficient for a chief credit officer to determine whether they have interest in additional information about or interaction with particular bank. Information such as growth, earnings, asset quality capital, lending limit total assets can be provided based on FDIC quarterly data. Growth can be calculated from unpublished quarterly reports of assets total and loans to regulators. Standard ratios also from the unpublished quarterly reports. The Texas Ratio reflects underperforming assets in relationship to capital structure. Other calculated ratios indicate the non performing buckets of different loan types as they relate to capital structure. Capital ratios are reported by banks to regulators. Total assets and loans are counts from the reports. Legal lending limits on the maximum size of an individual are calculated from reported capital.

Financial information can be further detailed as shown in the figure. Year to date, prior year and two prior years periods can be broken out and compared to averages, such as an average for the state in a relevant period. Drill down to more detailed financials and linking to source FDIC documents may be supported.

Figure 16:
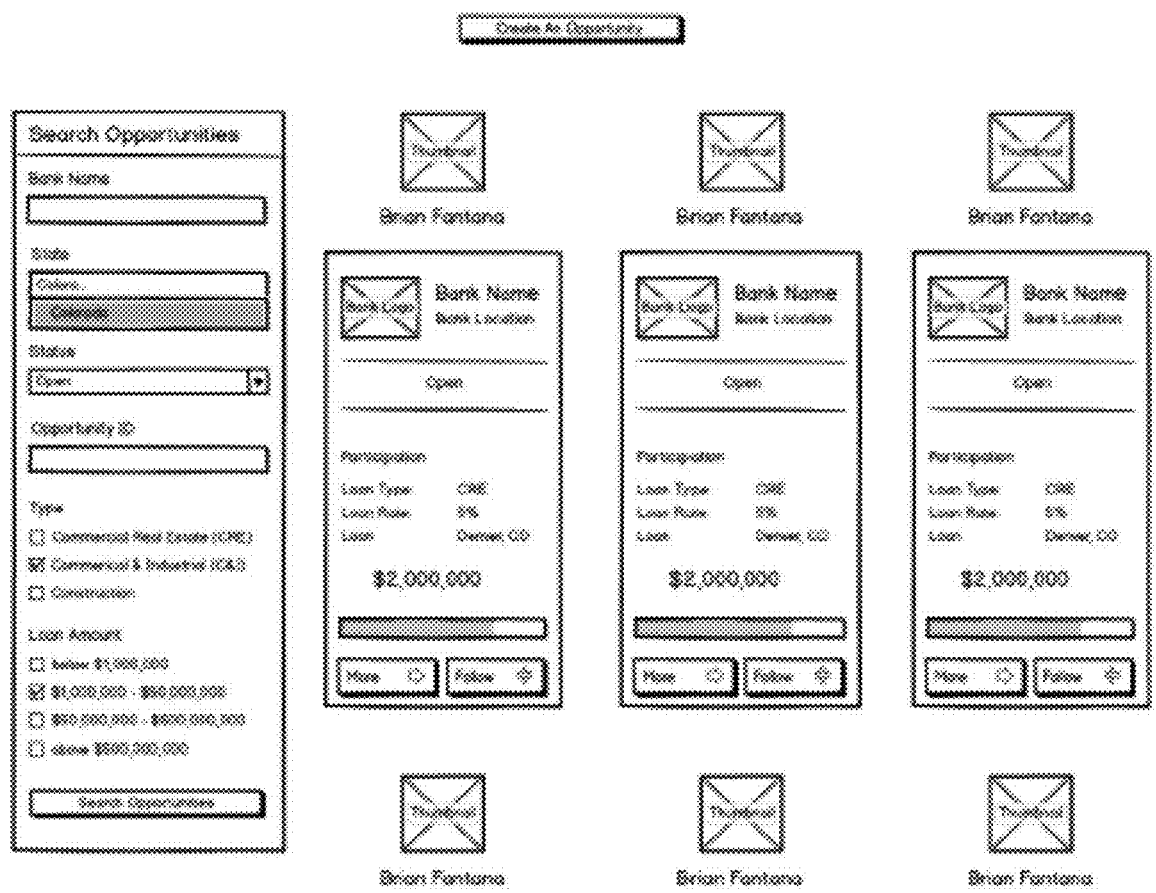
FIG. 16 illustrates an example search window and list of opportunities returned by a search.

FIG. 16 illustrates an example search window and list of opportunities returned by a search. Search criterion in this example include bank name, state, opportunity status, type, loan amount and an opportunity ID for direct taxes. In this example, results are returned with representative thumbnails and tiles for specific opportunities.

FIG. 17 illustrates an example detailed description of an opportunity. Sections of the detail provided include specific identification the borrower 1710, a description of the opportunity, including alone narrative and borrowing need 1720, statistics on the loan 1730 and a preliminary underwriting analysis 1740. Details in each of these categories are provided in the figure. These details may be accompanied by documents and participant management tabs.

Figure 18:
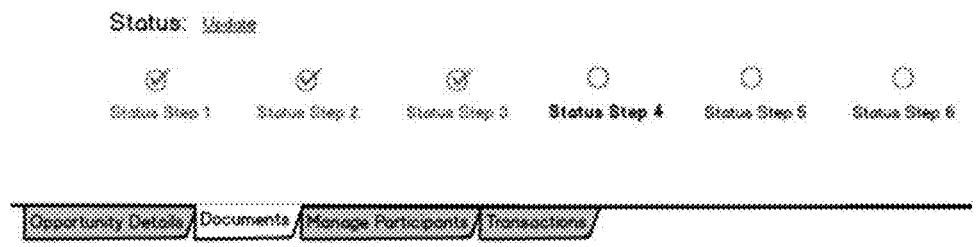
FIG. 18 illustrates an example listing of displays for particular transaction. The dashboard of transaction status can appear on this or any other detail page. Certain text in the figure is placeholder text in pseudo-Latin and has no English equivalent

FIG. 18 illustrates an example listing of displays for particular transaction. The dashboard of transaction status can appear on this or any other detail page.

Figure 19:
FIG. 19 illustrates an example dashboard of loan participant information.

FIG. 19 illustrates an example dashboard of loan participant information. In this list, the columns included bank name, contact person, click through for wire information, status of document signing, status of funds to a clearing bank, reservation amount, reservation status and editing icons.

Particular Implementations

In one implementation, a method is described that includes forming a marketplace for loan participation among small and medium sized banks, abbreviated SMBs. This method includes receiving more than 100 online applications from SMBs to a participation platform to participate in a loan participation marketplace, routing the online applications to at least one human to vet by interviewing executives of and/or performing background checks on the SMBs, and receiving a signal that the human vetted and approved enrollment of a particular SMB and enrolling the particular SMB in the loan participation marketplace. The method further includes receiving a participation opportunity from an initiating bank with evidence of authorization by an officer of the initiating bank to post the opportunity for electronic access by at least one selected group of prospective participants, the group selected by the initiating bank. The participation opportunity received is described in a standard fielded format with fields for at least geographic region, total loan amount, loan type, supporting collateral, and initiating bank. The participation platform accepts signals from the initiating bank to create one or more named groups of prospective participants from enrolled SMBs and to select among the named groups when posting the opportunity. Posting of the opportunity enables at least some of the prospective participants to request additional information via the participation platform supported by execution of a mutually acceptable confidentiality agreement.

The method further continues with posting the participation opportunity for electronic access by the group selected, wherein prospective participants in the group have permission either to view only the opportunity posting or to request the additional information.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features. The participation opportunity description can include a minimum participation amount, a minimum participation amount, a usage of loan proceeds and/or a status indicator of percentage completion of reservation requests to participate in the participation opportunity.

The method can further include receiving an electronic request for additional information by an interested prospect belonging to the group and forwarding the request for consideration by the initiating bank; receiving approval from the initiating bank to provide access to the additional information upon execution of the mutually acceptable confidentiality agreement; verifying execution by an officer of the prospective participant of the mutually acceptable confidentiality agreement; and making the additional information available for electronic access by the interested prospect.

Practicing this method, the mutually acceptable confidentiality agreement includes terms for return or destruction of the additional information. With this feature, the method further includes receiving a signal that the interested prospect has withdrawn its interest or that the initiating bank has withdrawn approval for access to the additional information; tracking the return or certification of destruction of the additional information; and closing the tracking responsive to a signal that the return or certification of destruction has been accomplished.

Some implementations of this method employ software that permits remote revocation of rights to view, print or otherwise use confidential data. In these implementations, withdrawal of interest by participating bank or withdrawal of approval by the initiating bank may be directly followed by revocation of rights to the confidential data.

Method can further include receiving a reservation request and commitment amount by the interested prospect; receiving signal of approval of the reservation request by the initiating bank; and updating a committed subscription percentage of the participation opportunity. This can extend to repeatedly receiving reservation requests, commitment amounts and signals of reservation approval until the committed subscription percentage equals or exceeds a ceded part of the total loan amount; and flagging that the participation opportunity is ready to proceed to closing.

On occasion, over-subscription to the participation opportunity happens. Then, the method can further include receiving signals from the initiating bank selecting participating banks from those given reservation approval; notifying non-selected banks who had received reservation approval of non-selection and soliciting requests to be placed on a standby list; receiving acceptances of standby list status; and posting to the acceptances of the standby list status for electronic access by the initiating bank.

The method can further include receiving signals from the initiating bank setting funding and closing dates; receiving an electronic copy of executed issuer-side documents or an electronic execution of the issuer-side documents for the participation opportunity; posting the funding and closing dates and copies the executed issuer-side documents or verification of execution for electronic access by package participating banks.

The method can further include receiving electronic confirmation from a clearing bank that committed funds from the package participating banks have been deposited with the clearing bank; posting copies of executed participant-side documents or verification of execution for electronic access by the initiating bank and the package participating banks; receiving electronic approvals of disbursement from the package participating banks; and electronically forwarding to the clearing bank an aggregate approval of disbursement of the deposited funds for funding by the initiating bank, responsive to the electronic approvals by the package participating banks.

The method can further include receiving an electronic request for bank performance data by an interested prospect belonging to the group; retrieving information compiled from banking regulators regarding the bank performance; and posting the requested bank performance data for electronic access by the interested prospect. The electronic request bank performance data can further be satisfied by retrieving information compiled by a loan servicing organization regarding performance of loans handled by a bank identified in the electronic request for bank performance data; and posting the information from the loan servicing organization with the requested bank performance data for electronic access by the interested prospect.

The method can further include receiving an electronic search request by an interested prospect; searching a database of more than 100 participation opportunities responsive to the request; and returning search results to the interested prospect. The search request can specify a geographic region and at least one category of use of loan proceeds.

Other implementations may include non-transitory computer readable storage medium storing instructions executable by a processor to perform a method is described above. Yet another implementation may include a system with memory and one or more processors operable to execute instructions stored in memory to perform a method is described above.

The invention claimed is:

1. A method by a computer-implemented workstation of locating participation opportunities for participation in loan participation among lenders including:
submitting an online application on behalf of a lender to a participation platform to participate in a loan participation marketplace, with consent for interview of at least one of applicant's executives and/or for performance of a background check, wherein
the loan participation marketplace includes at least 100 member lenders vetted and approved by a marketplace operator and
the loan participation marketplace makes available information about opportunities to participate in multi-million dollar commercial loans;
converting, by a combination of code implementing a graphic user interface at the one of the lenders and the participation platform, the online application from a non-standardized hardware and software platform into a standard fielded format for the member lenders in the loan participation marketplace and storing data from the lender's online application in the standard fielded format;
receiving electronic confirmation of enrollment of the lender in the loan participation marketplace;
submitting an electronic search query for participation opportunities posted by initiating lenders, wherein the participation opportunities are described in a standard fielded format with fields for at least geographic region, total loan amount, minimum participation amount, category of use of loan proceeds, and initiating lenders;
receiving query results of the electronic search query and facilitating scoring the participation opportunities amongst the query results whereby the query results may be organized by score;
submitting a request to the participation platform for additional information regarding at least one selected participation opportunity among the query results for which the lender is pre-authorized by an initiating lender to apply, supported by execution of a mutually acceptable confidentiality agreement and electronic confirmation of authority to execute the confidentiality agreement on behalf of the lender;
receiving the additional information wrapped in a digital security container via the participation platform regarding the selected participation opportunity;

causing display of at least part of the additional information;
submitting an electronic reservation request and commitment amount to the participation platform; and
receiving electronic notification of approval of the reservation request by the initiating lender.

2. The method of claim 1, wherein over-subscription to the participation opportunity happens, further including:
receiving electronic notification of over-subscription to the participation opportunity and notice that the lender has not been selected to participate, with an option to be placed on a standby list; and
submitting an acceptance to the participation platform of standby list status.

3. The method of claim 2, further including:
receiving electronic notification of having cleared the standby list; and
submitting an acceptance to the participation platform continued willingness to participate in the participation opportunity.

4. The method of claim 1, further including:
receiving electronic notification of funding and closing dates;
accessing an electronic copy of executed issuer-side documents for the participation opportunity;
submitting to the participation platform executed participant-side documents or an electronic execution of the participant-side documents.

5. The method of claim 4, further including:
receiving electronic confirmation that committed funds from package participating lenders have been deposited with a clearing bank;
submitting electronic approval by the lender of disbursement by the clearing bank of funds from the lender, contingent on disbursement of the funds from all of the package participating lender; and
receiving electronic confirmation from the participation platform of an aggregate approval of disbursement of the deposited funds for funding by the initiating lender.

6. The method of claim 1, further including:
submitting an electronic request for lender performance data on an initiating lender for the selected participation opportunity; and
accessing the requested lender performance data, retrieved by the participation platform from information compiled from banking regulators regarding the initiating lender performance.

7. The method of claim 6, further including:
accessing information compiled by a loan servicing organization regarding performance of loans handled by a lender identified in the electronic request for lender performance data, wherein the information regarding performance of loans is available from the participation platform.

8. The method of claim 1, wherein the electronic search query specifies a geographic region and at least one category of use of loan proceeds.

9. A non-transitory computer readable storage medium impressed with computer program instructions to locating participation opportunities for participation in loan participation among lenders, the instructions, when executed on a processor, implement a method comprising:
submitting an online application on behalf of a lender to a participation platform to participate in a loan participation marketplace, with consent for interview of at least one of applicant's executives and/or for performance of a background check, wherein
the loan participation marketplace includes at least 100 member lenders vetted and approved by a marketplace operator and
the loan participation marketplace makes available information about opportunities to participate in multi-million dollar commercial loans;
converting, by a combination of code implementing a graphic user interface at the one of the lenders and the participation platform, the online application from a non-standardized hardware and software platform into a standard fielded format for the member lenders in the loan participation marketplace and storing data from the lender's online application in the standard fielded format;
receiving electronic confirmation of enrollment of the lender in the loan participation marketplace;
submitting an electronic search query for participation opportunities posted by initiating lenders, wherein the participation opportunities are described in a standard fielded format with fields for at least geographic region, total loan amount, minimum participation amount, category of use of loan proceeds, and initiating lenders;
receiving query results of the electronic search query and facilitating scoring the participation opportunities amongst the query results whereby the query results may be organized by score;
submitting a request to the participation platform for additional information regarding at least one selected participation opportunity among the query results for which the lender is pre-authorized by an initiating lender to apply, supported by execution of a mutually acceptable confidentiality agreement and electronic confirmation of authority to execute the confidentiality agreement on behalf of the lender;
receiving the additional information wrapped in a digital security container via the participation platform regarding the selected participation opportunity;
causing display of at least part of the additional information;
submitting an electronic reservation request and commitment amount to the participation platform; and
receiving electronic notification of approval of the reservation request by the initiating lender.

10. The non-transitory computer readable storage medium of claim 9, wherein over-subscription to the participation opportunity happens, further including:
receiving electronic notification of over-subscription to the participation opportunity and notice that the lender has not been selected to participate, with an option to be placed on a standby list; and
submitting an acceptance to the participation platform of standby list status.

11. The non-transitory computer readable storage medium of claim 10, implementing the method further comprising:
receiving electronic notification of having cleared the standby list; and
submitting an acceptance to the participation platform continued willingness to participate in the participation opportunity.

12. The non-transitory computer readable storage medium of claim 11, implementing the method further comprising:
receiving electronic notification of funding and closing dates;
accessing an electronic copy of executed issuer-side documents for the participation opportunity;

submitting to the participation platform executed participant-side documents or an electronic execution of the participant-side documents.

13. The non-transitory computer readable storage medium of claim 12, implementing the method further comprising:
receiving electronic confirmation that committed funds from package participating lenders have been deposited with a clearing bank;
submitting electronic approval by the lender of disbursement by the clearing bank of funds from the lender, contingent on disbursement of the funds from all of the package participating lender; and
receiving electronic confirmation from the participation platform of an aggregate approval of disbursement of the deposited funds for funding by the initiating lender.

14. The non-transitory computer readable storage medium of claim 9, implementing the method further comprising:
submitting an electronic request for lender performance data on an initiating lender for the selected participation opportunity; and
accessing the requested lender performance data, retrieved by the participation platform from information compiled from banking regulators regarding the initiating lender performance.

15. The non-transitory computer readable storage medium of claim 14, implementing the method further comprising:
accessing information compiled by a loan servicing organization regarding performance of loans handled by a lender identified in the electronic request for lender performance data, wherein the information regarding performance of loans is available from the participation platform.

16. The non-transitory computer readable storage medium of claim 9, wherein the electronic search query specifies a geographic region and at least one category of use of loan proceeds.

17. A system including one or more processors coupled to memory of a workstation, the memory loaded with computer instructions to including:
submitting an online application on behalf of a lender to a participation platform to participate in a loan participation marketplace, with consent for interview of at least one of applicant's executives and/or for performance of a background check, wherein
the loan participation marketplace includes at least 100 member lenders vetted and approved by a marketplace operator and
the loan participation marketplace makes available information about opportunities to participate in multi-million dollar commercial loans;
converting, by a combination of code implementing a graphic user interface at the one of the lenders and the participation platform, the online application from a non-standardized hardware and software platform into a standard fielded format for the member lenders in the loan participation marketplace and storing data from the lender's online application in the standard fielded format;
receiving electronic confirmation of enrollment of the lender in the loan participation marketplace;
submitting an electronic search query for participation opportunities posted by initiating lenders, wherein the participation opportunities are described in a standard fielded format with fields for at least geographic region, total loan amount, minimum participation amount, category of use of loan proceeds, and initiating lenders;
receiving query results of the electronic search query and facilitating scoring the participation opportunities amongst the query results whereby the query results may be organized by score;
submitting a request to the participation platform for additional information regarding at least one selected participation opportunity among the query results for which the lender is pre-authorized by an initiating lender to apply, supported by execution of a mutually acceptable confidentiality agreement and electronic confirmation of authority to execute the confidentiality agreement on behalf of the lender;
receiving the additional information wrapped in a digital security container via the participation platform regarding the selected participation opportunity;
causing display of at least part of the additional information;
submitting an electronic reservation request and commitment amount to the participation platform; and
receiving electronic notification of approval of the reservation request by the initiating lender.

18. The system of claim 17, wherein over-subscription to the participation opportunity happens, further including:
receiving electronic notification of over-subscription to the participation opportunity and notice that the lender has not been selected to participate, with an option to be placed on a standby list; and
submitting an acceptance to the participation platform of standby list status.

19. The system of claim 18, further implementing actions comprising:
receiving electronic notification of having cleared the standby list; and
submitting an acceptance to the participation platform continued willingness to participate in the participation opportunity.

20. The system of claim 17, further implementing actions comprising:
receiving electronic notification of funding and closing dates;
accessing an electronic copy of executed issuer-side documents for the participation opportunity;
submitting to the participation platform executed participant-side documents or an electronic execution of the participant-side documents.

21. The system of claim 20, further implementing actions comprising:
receiving electronic confirmation that committed funds from package participating lenders have been deposited with a clearing bank;
submitting electronic approval by the lender of disbursement by the clearing bank of funds from the lender, contingent on disbursement of the funds from all of the package participating lender; and
receiving electronic confirmation from the participation platform of an aggregate approval of disbursement of the deposited funds for funding by the initiating lender.

22. The system of claim 17, further implementing actions comprising:
submitting an electronic request for lender performance data on an initiating lender for the selected participation opportunity; and
accessing the requested lender performance data, retrieved by the participation platform from information compiled from banking regulators regarding the initiating lender performance.

23. The system of claim 22, further implementing actions comprising:

accessing information compiled by a loan servicing organization regarding performance of loans handled by a lender identified in the electronic request for information regarding performance of loans, wherein the information regarding performance of loans is available from the participation platform.

24. The system of claim 17, wherein the electronic search query specifies a geographic region and at least one category of use of loan proceeds.

* * * * *